(12) United States Patent
Yang et al.

(10) Patent No.: US 11,698,164 B2
(45) Date of Patent: *Jul. 11, 2023

(54) MOUNTING BRACKET, MOUNTABLE LIGHT, AND METHODS OF INSTALLATION THEREOF

(71) Applicant: Gantri, Inc., San Leandro, CA (US)

(72) Inventors: Yi Yang, San Francisco, CA (US); Zeke Seminario, Oakland, CA (US); Nicolas Lenotte, San Francisco, CA (US); Jonas Lagerstadt, Brooklyn, NY (US)

(73) Assignee: Gantri, Inc., San Leandro, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,202

(22) Filed: Nov. 29, 2021

(65) Prior Publication Data

US 2022/0082205 A1    Mar. 17, 2022

Related U.S. Application Data

(63) Continuation of application No. 16/885,153, filed on May 27, 2020, now Pat. No. 11,215,319.

(51) Int. Cl.
*F16M 13/02* (2006.01)
*F21V 21/02* (2006.01)
*F21S 8/00* (2006.01)

(52) U.S. Cl.
CPC .............. *F16M 13/02* (2013.01); *F21S 8/033* (2013.01); *F21V 21/02* (2013.01)

(58) Field of Classification Search
CPC ........... F16M 13/02; F21S 8/033; F21V 21/02
USPC ....................................................... 248/221.12
See application file for complete search history.

(56) References Cited

U.S. PATENT DOCUMENTS

| | | | | |
|---|---|---|---|---|
| 5,433,416 | A * | 7/1995 | Johnson | B65D 23/003 403/381 |
| 6,371,424 | B1 * | 4/2002 | Shaw | F41G 1/54 248/222.12 |
| 6,824,028 | B2 * | 11/2004 | Mutai | A45F 5/02 224/904 |
| 10,138,917 | B2 * | 11/2018 | Koch | F16B 5/01 |
| 11,215,319 | B2 | 1/2022 | Yang et al. | |
| 2006/0038097 | A1 * | 2/2006 | Diller | A61G 13/101 248/225.11 |
| 2010/0254757 | A1 * | 10/2010 | Saul | F16B 12/20 403/404 |

(Continued)

*Primary Examiner* — Muhammad Ijaz
(74) *Attorney, Agent, or Firm* — Levine Bagade Han LLP (57) ABSTRACT

Disclosed are mounting brackets, mounting bracket assemblies, mountable lights, and methods of installation thereof. In one embodiment, a mounting bracket assembly comprises an obround-shaped wall mount configured to be mounted to a wall and a light mount configured to be coupled to a surface of a light. The wall mount comprises a raised internal ridge extending from a wall-facing side of the wall mount and a rim segment surrounding the raised internal ridge. A clearance space can be formed in between the wall and the rim segment when the wall mount is mounted to the wall. The light mount comprises a curved ledge and an inwardly-projecting brim. At least part of the curved ledge can rest on a top of the wall mount and the inwardly-projecting brim can be positioned within part of the clearance space when the light is mounted to the wall.

20 Claims, 6 Drawing Sheets

(56) References Cited

U.S. PATENT DOCUMENTS

| | | | |
|---|---|---|---|
| 2011/0146163 A1* | 6/2011 | Naroditsky | H05K 5/0204 52/27 |
| 2015/0272367 A1 | 10/2015 | Casey | |
| 2021/0372559 A1 | 12/2021 | Yang et al. | |

* cited by examiner

MOUNTING BRACKET, MOUNTABLE LIGHT, AND METHODS OF INSTALLATION THEREOF

CROSS-REFERENCE TO RELATED APPLICATION

This application is a continuation of U.S. patent application Ser. No. 16/885,153, filed on May 27, 2020, the content of which is incorporated herein by reference in its entirety.

TECHNICAL FIELD

The present disclosure relates generally to the field of mechanical wall mounts, and, more specifically, to an improved mounting bracket assembly, mounting brackets, mountable lights, and methods of installing such mounts and lights.

BACKGROUND

There are various ways to mount objects such as lights, picture frames, and other relatively lightweight items to a wall. The most popular method is to drive one or more straight or curved nails or screws into the wall and hang the object from such nails or screws. However, objects hung from nails and screws are often unstable and can become easily dislodged or misaligned when inadvertently bumped or through normal user interactions with the object.

Another prevalent method is to combine such nails or screws with one or more hooks or hangers. However, such hooks and hangers are prone to breaking, are unstable, and are often unsightly when a part of the hook or hanger is exposed.

Yet another method is to use specially-designed wall mounting assemblies such as interlocking Z-mounts, French cleats, or interlocking clip mounts. While these specially-designed mounting assemblies (e.g., Z-mounts, interlocking mounts, etc.) provide more stability and allow a user to mount an object closer to the wall (i.e., almost flush with the wall), they often require multiple nails or screws to affix the wall mount components to the wall. This can make such mounting assemblies less appealing for renters or short-term occupants of a dwelling who may shy away from the idea of making multiple holes in the wall to affix such wall mount components. In addition, most specially-designed mount assemblies do not allow room for error if one or more mount components are misaligned or not level. This can increase the difficulty of using such mounting assemblies since users must often install and uninstall the mount multiple times before an object is mounted correctly.

Therefore, a solution is needed which addresses the above shortcomings and disadvantages. Such a solution should not be overly complicated to install and allow a user to easily compensate for small errors. In addition, such a solution should be cost-effective and easy to manufacture.

SUMMARY

Disclosed are a mounting bracket assembly, mounting brackets, mountable lights, and methods of installing such mounts and lights. In one embodiment, a mounting bracket assembly is disclosed comprising a wall mount configured to be mounted to a wall. The wall mount can be obround-shaped and can comprise a raised internal ridge extending from a wall-facing side of the wall mount and a rim segment surrounding the raised internal ridge. A clearance space can be formed in between the wall and the rim segment when the wall mount is mounted to the wall.

The mounting bracket assembly can also comprise an object mount configured to be coupled to a surface of a mountable object. The object mount can comprise a curved ledge and an inwardly-projecting brim. The curved ledge can be complementary in shape to a top of the wall mount. At least part of the curved ledge can rest on a top of the wall mount and the inwardly-projecting brim can be positioned within part of the clearance space when the mountable object is mounted to the wall.

In some embodiments, the curved ledge can be substantially shaped as an arch. The curved ledge can be part of an upside down U-shaped protrusion extending from an object-facing surface of the object mount. At least part of the upside down U-shaped protrusion can be configured to be slid on to the top of the wall mount when the wall mount is mounted to the wall in order to mount the mountable object to the wall via the mounting bracket assembly.

In some embodiments, the upside down U-shaped protrusion can terminate at two protrusion ends. The two protrusion ends can flare laterally outward such that a distance separating the two protrusion ends is greater than a ledge width of the curved ledge. The flared protrusion ends can be configured to allow a user to more easily slide the object mount on to the wall mount and to level (or slightly adjust the rotational positioning of) the mountable object when the mountable object is mounted to the wall via the mounting bracket assembly.

In some embodiments, the upside down U-shaped protrusion can comprise a protrusion front surface. The protrusion front surface can be configured to contact the surface of the mountable object when the object mount is coupled to or otherwise engaged with the mountable object.

In some embodiments, the rim segment can be obround-shaped. At least part of the inwardly-projecting brim of the object mount can be shaped as an upside down U.

In some embodiments, the raised internal ridge of the wall mount can have a ridge height, the rim segment of the wall mount can have a rim height, and the ridge height can be greater than the rim height.

In some embodiments, the curved ledge of the object mount can have a ledge height. The ledge height can be substantially equal to the rim height of the rim segment.

In some embodiments, the wall mount can have a wall mount length and a wall mount width. The wall mount can further comprise a singular mounting hole positioned substantially in a center of the wall mount such that the singular mounting hole is positioned substantially at a midpoint along both the wall mount length and the wall mount width. The wall mount can be mounted to a wall via one mounting screw extending through the singular mounting hole.

In some embodiments, the object mount can comprise two object mount holes positioned laterally outward of the upside down U-shaped protrusion. The object mount can be coupled to the surface of the mountable object by two object mounting screws extending through the two object mount holes.

In another embodiment, a method of mounting an object to a wall is disclosed. The method can comprise mounting a wall mount to the wall. The wall mount can be obround shaped and comprise a raised internal ridge extending from a wall-facing side of the wall mount and a rim segment surrounding the raised internal ridge. A clearance space can be formed in between the wall and the rim segment when the wall mount is mounted to the wall.

The method can further comprise sliding a mountable object comprising an object mount coupled to a surface of the mountable object on to a top of the wall mount to mount the mountable object to the wall. The object mount can comprise a curved ledge and an inwardly-projecting brim. The curved ledge can be complementary in shape to a top of the wall mount. At least part of the curved ledge can rest on the top of the wall mount and the inwardly-projecting brim can be positioned within part of the clearance space when the mountable object is mounted to the wall.

In some embodiments, the step of sliding the mountable object on to the top of the wall mount can further comprise sliding at least part of an upside down U-shaped protrusion extending from an object-facing surface of the object mount on to the top of the wall mount.

In some embodiments, the step of mounting the wall mount to the wall can further comprise screwing one mounting screw into the wall through a singular mounting hole defined in the center of the wall mount, wherein the singular mounting hole is positioned substantially at a midpoint along both a wall mount length and a wall mount width of the wall mount.

The method can further comprise leveling the mountable object by adjusting the mountable object clockwise or counterclockwise when the mountable object is mounted to the wall. The upside down U-shaped protrusion can terminate at two protrusion ends. The two protrusion ends can flare laterally outward such that a distance separating the two protrusion ends is greater than a ledge width of the curved ledge. The flared protrusion ends can be configured to allow a user to more easily slide the object mount on to the wall mount and to level (or to slightly rotate) the mountable object when the mountable object is mounted to the wall via the wall mount and the object mount.

In another embodiment, a mountable lighting system can comprise a wall mount configured to be mounted to a wall. The wall mount can be obround-shaped and can comprise a raised internal ridge extending from a wall-facing side of the wall mount and a rim segment surrounding the raised internal ridge. A clearance space can be formed in between the wall and the rim segment when the wall mount is mounted to the wall. The mountable lighting system ca further comprise a light having a light surface and a light mount coupled to or integrated with the light surface.

The light mount can comprise a curved ledge and an inwardly-projecting brim. The curved ledge can be complementary in shape to a top of the wall mount. At least part of the curved ledge can rest on a top of the wall mount and the inwardly-projecting brim can be positioned within part of the clearance space when the light is mounted to the wall. In some embodiments, the light surface can comprise a depression or divot defined along the light surface in proximity to the light mount.

DETAILED DESCRIPTION

Figure 1A:
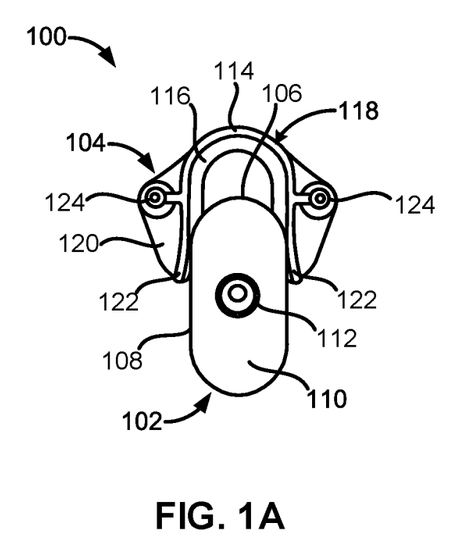
FIG. 1A illustrates one embodiment of a mounting bracket assembly.

FIG. 1A illustrates one embodiment of an improved mounting bracket assembly 100 for mounting objects to a wall or other mountable surface. The mounting bracket assembly 100 can comprise a wall mount 102 and an object mount 104. The wall mount 102 can be configured to be mounted to a wall. The object mount 104 can be configured to be coupled to a surface of a mountable object 502 (see, for example, FIGS. 5 and 6A-6D) such as a light, a board, a frame, a vase, a container, or a combination thereof.

The wall mount 102 can be substantially obround-shaped or resemble the shape of a stadium. For example, the wall mount 102 can have a substantially rectangular middle section or midportion with semicircles at opposite ends. In some embodiments, the wall mount 102 can be partially obround such that the wall mount 102 can have a substantially rectangular portion and only one semicircle connected to the rectangular portion.

The wall mount 102 can be configured to be mounted upright such that one of the semicircles (or the semicircle) serves as a top 106 of the wall mount 102. In some embodiments, the wall mount 102 can comprise substantially parallel lateral sides 108 along a middle section or midportion of the wall mount 102. In other embodiments, the sides 108 of the wall mount 102 can converge or diverge.

Figure 1B:
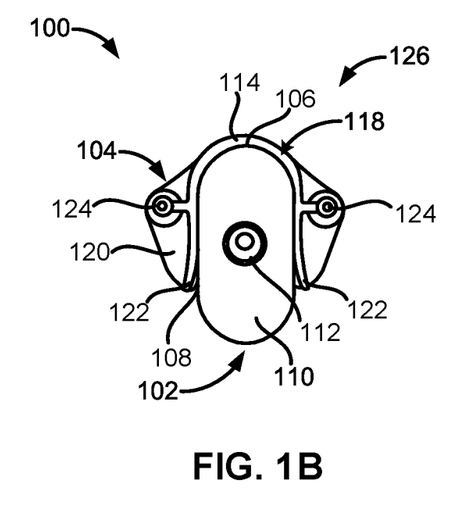
FIG. 1B illustrates the mounting bracket assembly in an engaged configuration.
Figure 1C:
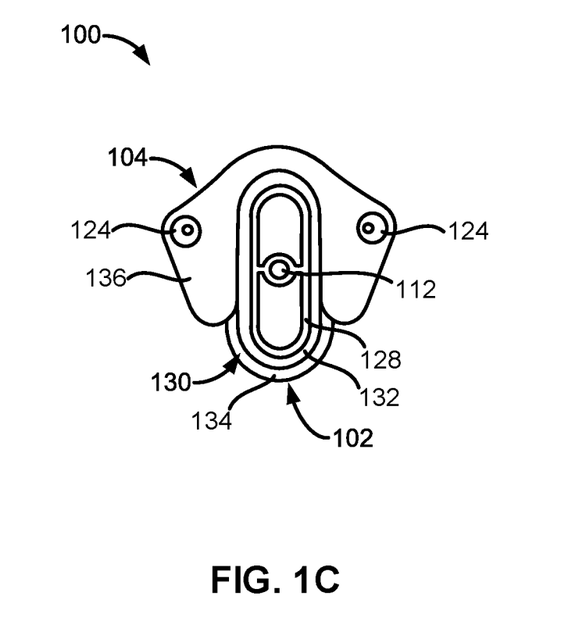
FIG. 1C illustrates a rear view of the mounting bracket assembly in the engaged configuration.
Figure 1D:
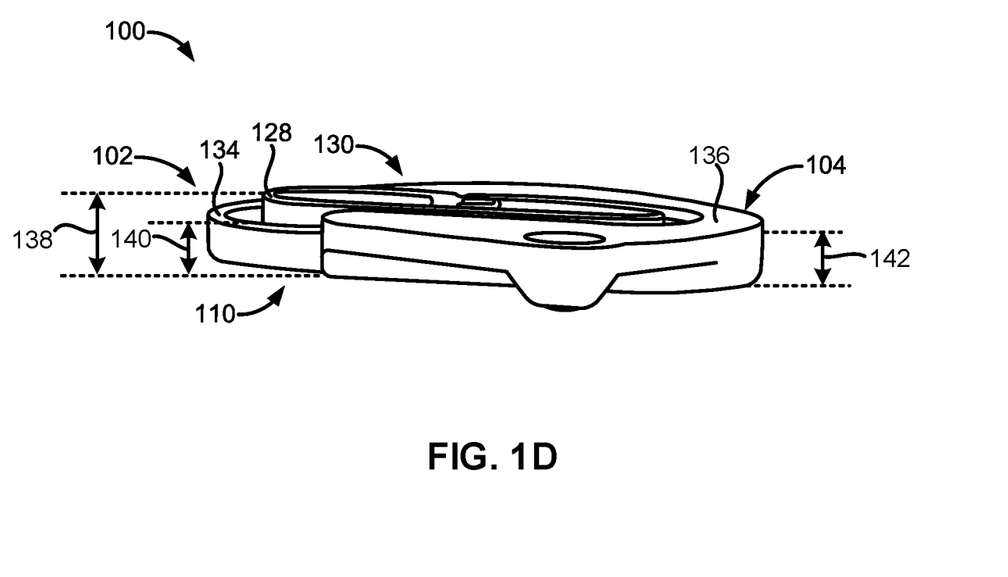
FIG. 1D illustrates the mounting bracket assembly of FIG. 1C laid flat.
Figure 2A:
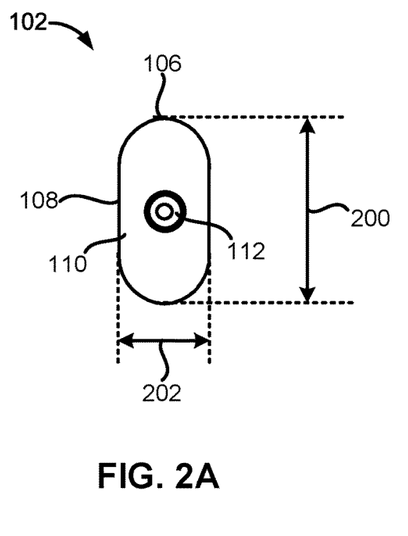
FIG. 2A illustrates a front view of one embodiment of a wall mount.
Figure 2B:
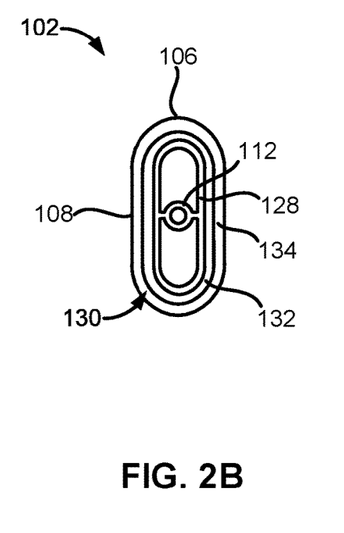
FIG. 2B illustrates a rear view of the wall mount of FIG. 2A.

The wall mount 102 can comprise an object-facing side 110 and a wall-facing side 130 (see, for example, FIGS. 1C-1D and 2B). In some embodiments, the object-facing side 110 of the wall mount 102 can be substantially flat or flush. In other embodiments, at least part of the object-facing side 110 can be concave or sunken. In these and other embodiments, the contour or geometry of the object-facing side 110 of the wall mount 102 can accommodate or be complementary to a surface (e.g., a rear or side surface) of a mountable object 502.

The wall mount 102 can also comprise a raised internal ridge 128 extending from a wall-facing side 130 of a wall mount body 132 of the wall mount 102 (see, for example, FIGS. 1C-1D and 2B). The wall mount 102 can also comprise a rim segment 134 surrounding the raised internal ridge 128 (see, for example, FIGS. 1C-1D and 2B).

Figure 5:
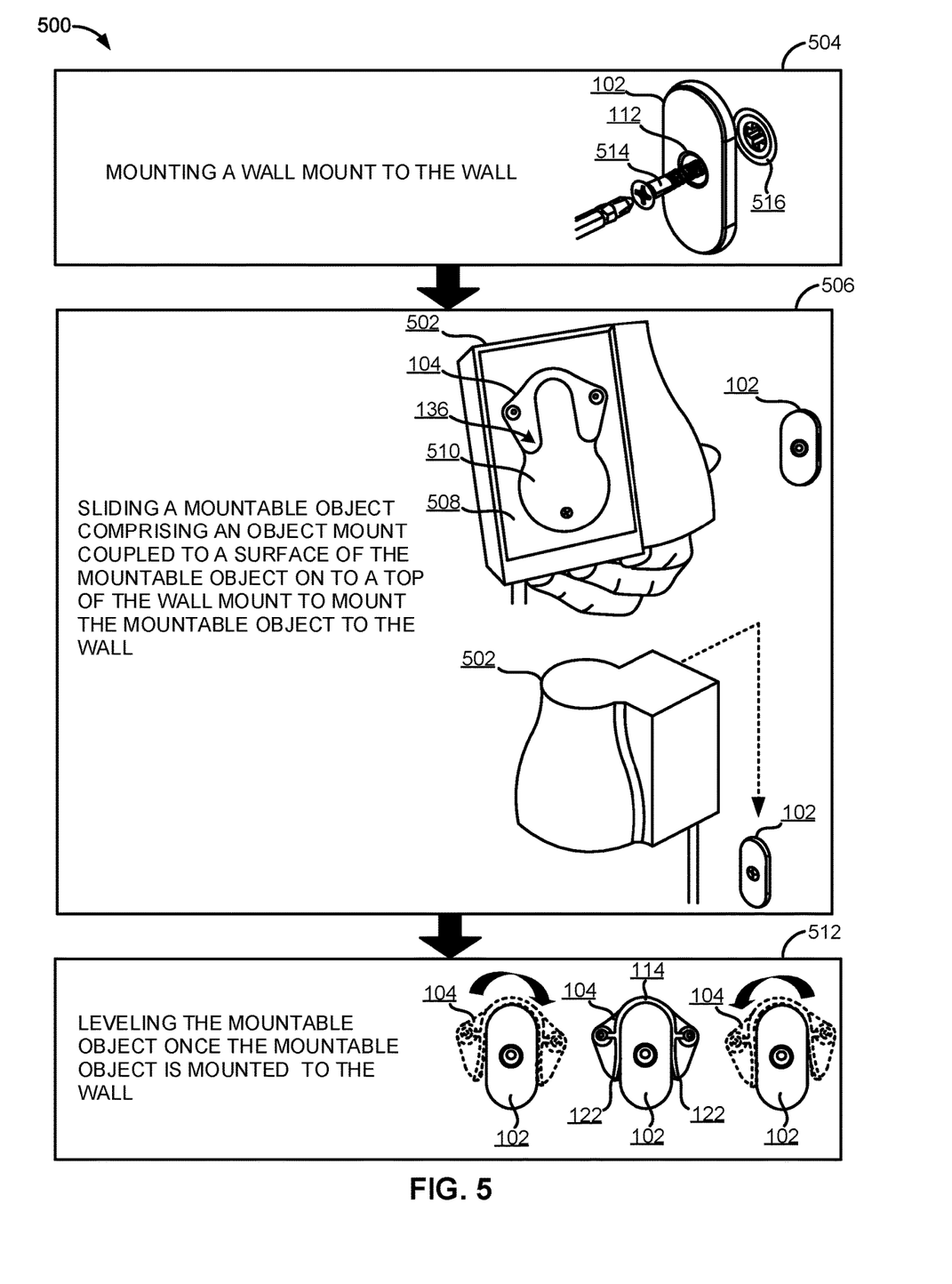
FIG. 5 illustrates an example method of mounting a mountable object or light using the mounting bracket assembly disclosed herein.

In some embodiments, the wall mount 102 can be mounted with only one mounting screw 514 (see, for example, FIG. 5). The one mounting screw 514 can extend through a singular mounting hole 112 positioned substantially in a center of the wall mount 102.

As will be discussed in more detail in the following sections, a clearance space 400 (see, for example, FIG. 4) can be formed in between the wall and the rim segment 134 when the wall mount 102 is mounted to the wall.

The object mount 104 can comprise a curved ledge 114 and an inwardly-projecting brim 116. The shape or geometry of the curved ledge 114 can be complementary to or accommodate a shape of the top 106 of the wall mount 102.

In some embodiments, the curved ledge 114 can be substantially shaped as an arch.

Figure 3A:
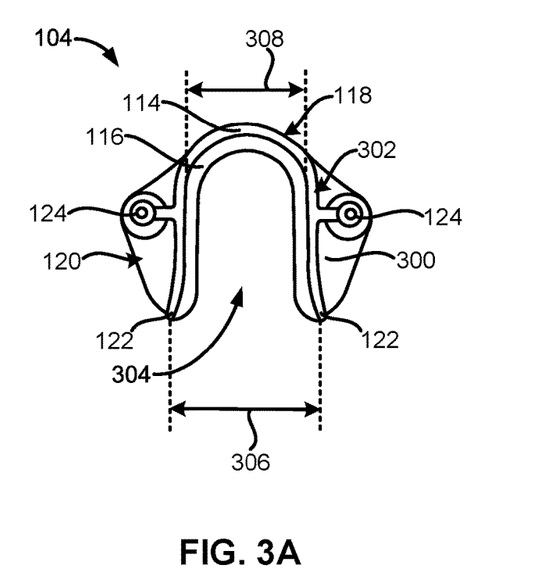
FIG. 3A illustrates a front view of one embodiment of an object mount.

The curved ledge 114 can be part of an upside down U-shaped protrusion 118 extending from an object-facing surface 120 of the object mount 104. For example, the curved ledge 114 can be the top of the upside down U-shaped protrusion 118. The upside down U-shaped protrusion 118 can have elongate lateral legs as shown in FIGS. 1A-1B and 3A).

In some embodiments, the inwardly-projecting brim 116 of the object mount 104 can also be shaped as an upside down U. In other embodiments, the inwardly-projecting brim 116 can be complementary to or accommodate a shape of the rim segment 134 of the wall mount 102.

The upside down U-shaped protrusion 118 can terminate at two protrusion ends 122. The two protrusion ends 122 can flare laterally outward such that a distance separating the two protrusion ends 122 is greater than a width of the curved ledge 114. The flared protrusion ends 122 can allow a user to more easily slide the object mount 104 on to the wall mount 102. The flared protrusion ends 122 can allow a user to level or adjust a positioning/alignment of a mountable object 502 when the mountable object 502 is mounted to the wall via the mounting bracket assembly 100.

The object mount 104 can also comprise two object mount holes 124 positioned laterally outward of the upside down U-shaped protrusion 118. The object mount 104 can be coupled to a surface (e.g., a rear surface or side surface) of the mountable object 502 by two screws extending through the two object mount holes 124.

FIG. 1A illustrates the object mount 104 being slid on to the wall mount 102 to engage or interlock with the wall mount 102. The object mount 104 can be slid on to the wall mount 102 when the wall mount 102 is securely mounted to a wall. As shown in FIG. 1A, at least part of the upside down U-shaped protrusion 118 can be slid on to the top 106 of the wall mount to engage or interlock the object mount 104 with the wall mount 102. The flared protrusion ends 122 of the upside down U-shaped protrusion 118 can allow a user to more easily slide the object mount 104 on to the wall mount 102.

FIG. 1B illustrates the mounting bracket assembly 100 in an engaged configuration 126. At least part of the curved ledge 114 can rest on the top 106 of the wall mount 102 when the mounting bracket assembly 100 is in the engaged configuration 126. Moreover, the inwardly-projecting brim 116 can be positioned within part of the clearance space 400 (see, for example, FIG. 4) when the object mount 104 is engaged with the mounted wall mount 102. The inwardly-projecting brim 116 can be caught in between the wall and the rim segment 134 of the mounted wall mount 102 when the mounting bracket assembly 100 is in the engaged configuration 126.

As shown in FIG. 1B, the object mount holes 124 of the object mount 104 can be positioned vertically above or superior to the singular mounting hole 112 when the mounting bracket assembly 100 is in the engaged configuration 126. In addition, the upside down U-shaped protrusion 118 can partially surround the obround-shaped wall mount 102, including the sides 108 of the wall mount 102, when the mounting bracket assembly 100 is in the engaged configuration 126.

One technical problem faced by the applicant is how to securely hang relatively lightweight objects to a wall without requiring a user to hammer multiple nails or insert multiple screws into a wall. One solution discovered by the applicant and disclosed herein is the unique mounting bracket assembly 100 comprising a wall mount 102 and object mount 104 having the geometries and/or dimensions disclosed herein. The weight of the mountable object 502 is distributed over the rounded top 106 of the wall mount 102, which reduces the likelihood that the wall mount 102 will become dislodged from the wall when the mountable object 502 is mounted to the via the mounting bracket assembly 100. Moreover, the unique shape or geometries of the wall mount 102 and object mount 104 ensure that the mountable object 502 does not tilt or become misaligned when mounted to the wall. Moreover, the wall mount 102 is aesthetically pleasing and unobtrusive when mounted to a wall (even when exposed).

FIG. 1C illustrates a rear view of the mounting bracket assembly 100 in the engaged configuration 126. FIG. 1C illustrates that the wall mount 102 can comprise a raised internal ridge 128 extending from a wall-facing side 130 of a wall mount body 132 of the wall mount 102. The wall mount 102 can also comprise a rim segment 134 surrounding the raised internal ridge 128.

In some embodiments, the raised internal ridge 128 and the rim segment 134 can be configured as obround-shaped rings extending orthogonally from the wall mount body 132 of the wall mount 102. As shown in FIG. 1C, the rim segment 134 and the raised internal ridge 128 can be configured as concentric obround-shaped rings with the raised internal ridge 128 positioned radially inward of the rim segment 134.

In other embodiments, at least one of the raised internal ridge 128 and the rim segment can be substantially rectangular-shaped, oval-shaped, circular-shaped, or a combination thereof. In these and other embodiments, at least one of the raised internal ridge 128 and the rim segment 134 can be discontinuous or comprise one or more breaks along the ridge or segment. In these and other embodiments, at least one of the raised internal ridge 128 and the rim segment 134 can refer to unconnected parallel raised ridges or segments rather than a continuous ring or polygon.

FIG. 1C also illustrates that a wall-facing surface 136 of the object mount 104 can be substantially flat or flush. In other embodiments, the wall-facing surface 136 of the object mount 104 can comprise one or more concave surface portions or depressions.

FIG. 1D illustrates the mounting bracket assembly 100 of FIG. 1C laid flat such that the object-facing side 110 of the wall mount 102 faces downward. FIG. 1D illustrates that the raised internal ridge 128 of the wall mount can have a ridge height 138.

Figure 4:
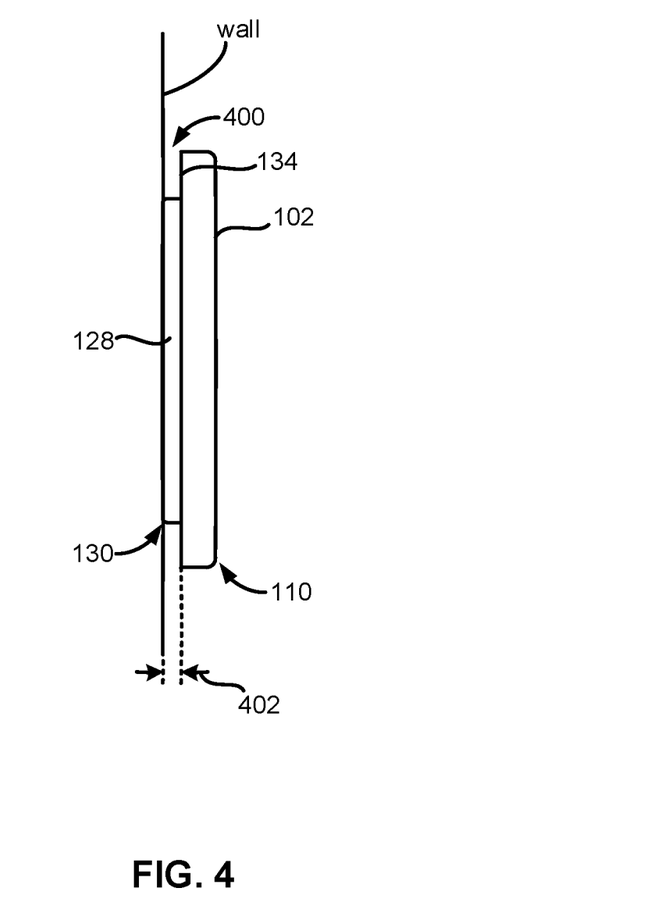
FIG. 4 illustrates an example of a clearance space created by a mounted wall mount.

FIG. 1D also illustrates that the rim segment 134 of the wall mount 102 can have a rim height 140. The ridge height 138 can be greater than the rim height 140. The height difference between the ridge height 138 and the rim height 140 can allow for the clearance space 400 to be created when the wall mount 102 is mounted to the wall.

In some embodiments, the ridge height 138 can be between about 4.0 mm to about 10.0 mm. For example, the ridge height 138 can be about 6.00 mm, about 8.00 mm, or any height dimensions therebetween. In other embodiments, the ridge height 138 can be less than 4.0 mm (e.g., between about 2.0 mm and 3.0 mm) or greater than 10.0 mm (e.g., between about 12.0 mm and 15.0 mm).

The rim height 140 can be between about 2.0 mm to about 8.0 mm. For example, the ridge height 138 can be about 4.00 mm, about 6.00 mm, or any height dimensions therebetween. In other embodiments, the ridge height 138 can be less than 2.0 mm (e.g., about 1.0 mm) or greater than 8.0 mm (e.g., about 10.0 mm).

The wall mount 102 can be configured such that the ratio of the ridge height 138 to the rim height 140 can be about 3:2. In other embodiments, the ratio of the ridge height 138 to the rim height 140 can be about 2:1 or about 5:3. The rim height 140 and the ridge height 138 can be different dimensions than those disclosed herein as long as these ratios are maintained.

The curved ledge 114 of the object mount 104 can also have a ledge height 142. The curved ledge 114 is obscured in FIG. 1D. The ledge height 142 can be substantially equivalent to the rim height 140 of the rim segment 134. For example, the ledge height 142 can be between about 4.0 mm to about 10.0 mm. For example, the ledge height 142 can be about 6.00 mm, about 8.00 mm, or any height dimensions therebetween.

FIGS. 2A-2B illustrate front and rear views, respectively, of one embodiment of the wall mount 102. The wall mount 102 can have a wall mount length 200 and a wall mount width 202. As shown in FIG. 2A, the singular mounting hole 112 can be positioned in a center of the wall mount 102 or substantially at a midpoint along both the wall mount length 200 and the wall mount width 202.

In some embodiments, the wall mount length 200 can be between about 35.0 mm to about 100.0 mm. For example, the wall mount length 200 can be about, 40.0 mm, about 50.0 mm, about 60.0 mm, about 70.0 mm, about 80.0 mm, about 90.0 mm, or any length dimensions therebetween. In other embodiments, the wall mount length 200 can be between about 100.0 mm to about 200.0 mm in order to mount larger objects.

The wall mount width 202 can be between about 10.0 mm to about 50.0 mm. For example, the wall mount width 202 can be about 20.0 mm, about 25.0 mm, about 30.0 mm, about 35.0 mm, about 40.00 mm, or any width dimensions therebetween. The wall mount width 202 can be the diameter of the semicircle portion(s). In other embodiments, the wall mount length 200 can be between about 50.0 mm to about 100.0 mm in order to mount larger objects.

The wall mount 102 can be configured such that the ratio of the wall mount width 202 to the wall mount length 200 can be about 1:2. In other embodiments, the ratio of the wall mount width 202 to the wall mount length 200 can be about 1:3 or about 2:5. The wall mount width 202 and the wall mount length 200 can be different dimensions than those disclosed herein as long as these ratios are maintained.

Although one singular mounting hole 112 is shown in FIGS. 2A-2B, it is contemplated by this disclosure, in alternative embodiments, that the wall mount 102 can comprise multiple mounting holes. For example, the multiple mounting holes can run down the length of the wall mount 102 (along a midline of the wall mount 102) or arranged in a pattern throughout the wall mount body 132.

FIG. 2B illustrates that the rim segment 134 and the raised internal ridge 128 can be substantially obround-shaped or oval-shaped. The rim segment 134 and the raised internal ridge 128 can extend orthogonally from the wall mount body 132 of the wall mount 102. As shown in FIG. 2B, the rim segment 134 and the raised internal ridge 128 can be configured as concentric obround-shaped rings with the raised internal ridge 128 positioned radially inward of the rim segment 134.

A few technical problems faced by the applicant is how to design a wall mount 102 that is aesthetically pleasing, easy to install, and leaves little or no scuff marks on a wall or mounting surface when mounted and after the wall mount 102 is removed from the wall or mounting surface. The solution discovered by the applicant and disclosed herein is the unique wall mount 102 having the geometries and/or dimensions previously disclosed.

Figure 3B:
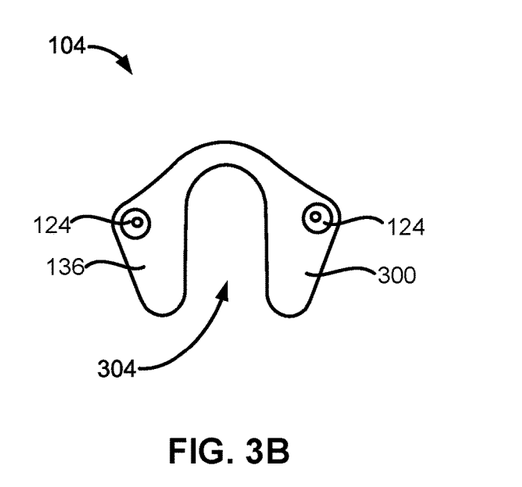
FIG. 3B illustrates a rear view of the object mount of FIG. 3A.

FIGS. 3A-3B illustrate front and rear views, respectively, of one embodiment of the object mount 104 (e.g., light mount). A front view, in this context, refers to viewing an object-facing surface 120 of the object mount 104 and a rear view, in this context, refers to viewing a wall-facing surface 136 of the object mount 104.

FIG. 3A illustrates that the object mount 104 can comprise an upside down U-shaped protrusion 118 extending orthogonally from an object mount body 300. The object mount body 300 can be substantially flat.

As shown in FIGS. 3A and 3B, the object mount body 300 can have a substantially pentagonal profile or shape. In other embodiments, the object mount body 300 can have a substantially hexagonal or other polygonal shape or profile. In further embodiments, the object mount body 300 can have an oval or obround shape or profile.

The upside down U-shaped protrusion 118 can be positioned radially outward of the inwardly-projecting brim 116. In some embodiments, the inwardly-projecting brim 116 can be part of or integrated with the object mount body 300. In other embodiments, the inwardly-projecting brim 116 can be coupled or affixed to the object mount body 300. In some embodiments, at least part of the inwardly-projecting brim 116 can be shaped substantially as an upside down U.

The upside down U-shaped protrusion 118 can have a protrusion front surface 302. In some embodiments, the protrusion front surface 302 can be configured to contact the surface (e.g., a rear surface or side surface) of the mountable object 502 when the object mount 104 is coupled or otherwise affixed to the mountable object 502. When the object mount 104 is coupled or otherwise affixed to the mountable object 502, the upside down U-shaped protrusion 118, the inwardly-projecting brim 116, and the surface (e.g., the rear surface or side surface) of the mountable object create a partially enclosed receiving space for at least part of the wall mount 102. For example, the top 106 and middle portion of the wall mount 102 can slide into the partially enclosed receiving space when the user engages the object mount 104 with the mounted wall mount 102.

FIGS. 3A and 3B also illustrate that the object mount body 300 can have a void space 304 or cutout defined along a midportion or middle of the object mount body 300. The void space 304 or cutout can have a shape or dimensions that complement at least part of the shape or dimensions of the wall mount 102 or feature(s) thereof. For example, when the wall mount 102 (including the raised internal ridge 128) is substantially obround-shaped, the void space 304 or cutout can be at least partially obround-shaped. In other embodiments, the void space 304 or cutout can have a shape or dimensions that are not the same as the shape or dimensions of the wall mount 102 or feature(s) thereof. In these embodiments, the void space 304 or cutout can have a void width that is greater than a width of the raised internal ridge 128.

When the wall mount 102 is mounted to the wall or other mounting surface, the void space 304 or cutout allows part of the object mount 104 to slide over or cap on to part of the mounted wall mount 102.

FIG. 3A further illustrates that the upside down U-shaped protrusion 118 terminates at two protrusion ends 122. The two protrusion ends 122 can flare laterally outward such that a distance separating the two protrusion ends 122 (hereinafter referred to as a protrusion separation width 306) is greater than a ledge width 308 of the curved ledge 114 at the top of the upside down U-shaped protrusion 118. The flared protrusion ends 122 are configured to allow a user to more easily slide the object mount 104 on to the mounted wall mount 102 and to allow a user to level or slightly adjust the rotation of the mountable object 502 when the mountable object 502 is mounted to the wall via the mounting bracket assembly 100 (see, for example, FIG. 5).

FIG. 3B illustrates that, in some embodiments, the object mount 104 can comprise two object mount holes 124 positioned laterally outward of the upside down U-shaped protrusion 118. In these embodiments, the object mount 104 can be coupled to the surface of the mountable object 502 by two object mounting screws (not shown) extending through the two object mount holes 124. When the object mount body 300 has a substantially pentagonal profile or shape, the object mount holes 124 can be positioned at non-adjacent corners of the pentagon. Moreover, although two object mount holes 124 are shown in the figures, it is contemplated that the object mount 104 can comprise three, four, or more object mount holes 124 for affixing or otherwise securing the object mount 104 to larger mountable objects.

Furthermore, although the object mount holes 124 are shown in the figures, it is contemplated by this disclosure that the object mount 104 can be affixed or otherwise secured to the mountable object 502 by adhesives, clips, ties, holders, an interference fit, or a combination thereof. In other embodiments, the object mount 104 can be affixed or otherwise secured to the mountable object 502 by one or more screws in combination with adhesives, clips, ties, holders, or an interference fit.

In further embodiments, the object mount 104 can be integrated with the mountable object 502 or be a contiguous surface feature of the mountable object 502. For example, when the mountable object 502 is a light, frame, board, or container, the object mount 104 can be integrated with or be defined on a surface of the light, frame, board, or container.

In some embodiments, at least one of the wall mount 102 and the object mount 104 can be made in part of a polymeric material, a metallic material, a ceramic, or wood. More specifically, at least one of the wall mount 102 and the object mount 104 can be made in part of a hard thermoplastic such as polycarbonate (PC). In other embodiments, at least one of the wall mount 102 and the object mount 104 can be made in part of acrylonitrile butadiene styrene (ABS) or polyvinyl chloride (PVC). In further embodiments, at least one of the wall mount 102 and the object mount 104 can be made in part of stainless steel or aluminum.

FIG. 4 illustrates that a clearance space 400 can be formed in between the wall and the rim segment 134 when the wall mount 102 is mounted to the wall. The clearance space 400 can be a gap or free space separating the rim segment 134 from the wall. When the wall mount 102 is substantially obround-shaped, the clearance space 400 can be substantially shaped as an obround ring.

The clearance space 400 can have a space depth 402. In some embodiments, the space depth 402 can be between about 1.0 mm to about 2.0 mm. For example, the space depth 402 can be about 1.2 mm, about 1.4 mm, about 1.6 mm, about 1.8 mm, or any depth dimensions therebetween. In other embodiments, the space depth 402 can be between about 2.0 mm and 3.0 mm. For example, the space depth 402 can be about 2.2 mm, about 2.4 mm, about 2.6 mm, about 2.8 mm, or any depth dimensions therebetween.

At least part of the inwardly-projecting brim 116 of the object mount 104 can be positioned within at least part of the clearance space 400 when the object mount 104 is engaged with the mounted wall mount 102. More specifically, at least part of the inwardly-projecting brim 116 of the object mount 104 can be caught in between the wall and at least part of the rim segment 134 of the wall mount 102 when the object mount 104 is engaged with the mounted wall mount 102.

A user can also remove the mountable object 502 from the wall mount 102 (i.e., disengage the object mount 104 from the wall mount 102) by sliding the mountable object 502 off of the wall mount 102 and removing the inwardly-projecting brim 116 of the object mount from the clearance space 400.

FIG. 5 illustrates a method 500 of mounting a mountable object 502 to a wall. The method 500 can comprise mounting a wall mount 102 to the wall in a first step 504. The method 500 can also comprise a second step 506 of sliding the mountable object 502 comprising an object mount 104 coupled to a surface 508 of the mountable object 502 on to a top 106 of the wall mount 102 to mount the mountable object 502 to the wall. The surface 508 can be a rear surface or a side surface of the mountable object 502. The surface 508 can have a depression 510 or divot along the surface 508. The depression 510 or divot can be positioned or defined in proximity to (e.g., below) the object mount 104 coupled or affixed to the surface 508 of the mountable object 502. The depression 510 or divot can allow the object mount 104 to more easily slide on to the wall mount 102.

The method 500 can further comprise an optional third step 512 of leveling the mountable object 502 once the mountable object 502 is mounted to the wall via the mounting bracket assembly 100 by slightly adjusting the mountable object 502 clockwise or counterclockwise (e.g., by slightly tilting or adjusting the rotation of the mountable object 502 clockwise or counterclockwise).

More specifically, the first step 504 can involve mounting the wall mount 102 to the wall by screwing a singular mounting screw 514 into the wall through a singular mounting hole 112 defined in the center of the wall mount 102. Alternatively, a wall anchor 516 or anchor screw can be inserted into the wall first to distribute the applied force of the mounting screw 514 over a larger surface area of the wall or to prevent the weight of the mountable object 502 from pulling the mounting screw 514 out of the wall. The wall anchor 516 can be used when the wall mount 102 is mounted to drywall, other types of hollow walls, or plasterboard. In these embodiments, the mounting screw 514 can be screwed into the wall anchor 516 rather than directly into the wall.

The second step 506 can involve positioning the mountable object 502 such that the object mount 104 affixed or secured to the rear or side surface of the mountable object 502 is directly over the top 106 of the wall mount 102 and sliding the object mount 104 on to the top 106 of the wall mount 102.

As previously discussed, the wall mount 102 can be obround-shaped and can comprise a raised internal ridge 128 extending from the wall-facing side 130 of the wall mount body 132 (see, for example, FIGS. 1C and 1D) of the wall mount 102. The wall mount 102 can also comprise a rim segment 134 (see, for example, FIGS. 1C and 1D) surrounding the raised internal ridge 128. A clearance space 400 (see, for example, FIG. 4) can be formed in between the wall and the rim segment 134 when the wall mount 102 is mounted to the wall. The object mount 104 can comprise an inwardly-projecting brim 116 and an upside down U-shaped protrusion 118 extending from an object-facing surface 120 of the object mount 104. The upside down U-shaped protrusion 118 can comprise a curved ledge 114.

Sliding the mountable object 502 on to the top 106 of the wall mount 102 can further involve sliding at least part of the upside down U-shaped protrusion on to the top 106 of the wall mount 102. At least part of the curved ledge 114 can rest on the top of the wall mount 102 and the inwardly-projecting brim 116 can be positioned within the clearance space 400 or caught in between the wall and the rim segment 134 of the wall mount 102 when the mountable object 502 is mounted to the wall via the mounting bracket assembly 100.

The third step 512 can involve leveling the mountable object 502 once the mountable object 502 is mounted to the wall via the mounting bracket assembly 100 by slightly adjusting, rotating, or tilting the mountable object 502 clockwise or counterclockwise. The unique design of the object mount 104 can allow the mountable object 502 to be leveled or to correct the alignment of the mountable object 502 even after the mountable object 502 is mounted to the wall via the mounting bracket assembly 100.

As previously discussed, the upside down U-shaped protrusion 118 of the object mount can terminate at two protrusion ends 122. The two protrusion ends 122 flare laterally outward such that a distance separating the two protrusion ends 122 is greater than a ledge width 308 of the curved ledge 114. The flared protrusion ends 122 can allow a user to more easily engage the object mount 104 with the mounted wall mount 102. The flared protrusion ends 122 can also allow a user to more easily level the mountable object 502 by slightly rotating or tilting the mountable object 502 clockwise or counterclockwise after the mountable object 502 is already mounted to the wall via the mounting bracket assembly 100.

One technical problem faced by the applicant is how to design a mounting bracket assembly 100 where a mountable object 502 having an object mount 104 affixed or otherwise secured to the mountable object 502 can be easily and quickly mounted to a wall via a wall mount 102 and unmounted from the wall or wall mount 102. Another technical problem faced by the applicant is how to design a mounting bracket assembly 100 where the level or rotational positioning of the mountable object 502 can be adjusted (e.g., slightly tilted or slightly rotated) after being mounted. The solution discovered by the applicant is the unique design of the object mount 104 disclosed herein having the flared protrusion ends 122 and the wall mount 102 disclosed herein having the previously disclosed shape and geometries.

Figure 6A:
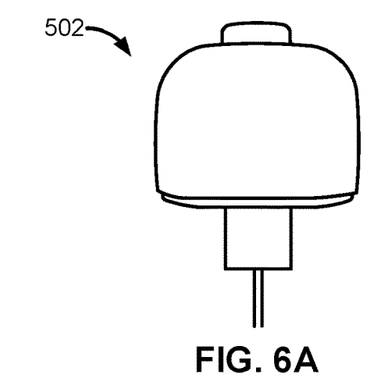
FIG. 6A illustrates an embodiment of a mountable object.
Figure 6B:
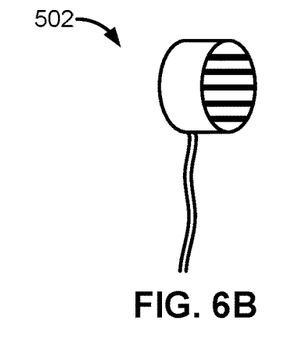
FIG. 6B illustrates another embodiment of a mountable object.

FIGS. 6A-6D illustrate examples of mountable objects 502 that can be mounted to a wall or another mounting surface by the mounting bracket assembly 100. FIGS. 6A and 6B illustrate that the mountable objects 502 can be lights or lamps that can be mounted to a wall or another mounting surface by the mounting bracket assembly 100. As previously discussed, the lights or lamps can each have a rear or side surface comprising a depression or divot (see for example, the depression 510 shown in FIG. 5) defined along the rear or side surface. The depression or divot can be positioned or defined in proximity to the object mount 104 coupled or affixed to the rear surface of the light or lamp (e.g., by screws, clips, or adhesive). When the object mount 104 is coupled to a light or lamp, the object mount 104 can be considered a light mount. In some embodiments, the light mount or features thereof can be incorporated or defined as part of the rear or side surface of the light or lamp.

When the mountable object 502 is a light or lamp as shown in FIGS. 6A and 6B, the wall mount 102 and the light or lamp having the light mount coupled thereto can be considered part of a mountable lighting system. As shown in FIGS. 6A and 6B, the light or lamp can have an electrical cord extending from the light or lamp. In these and other embodiments, the mountable lighting system can comprise a light switch electrically coupled to or in electrical communication with the mountable light or lamp. In additional embodiments, the light or lamp can be powered by one or more batteries or be electrically coupled to or in electrical communication with wires from an AC power supply such as a mains power of a residential or commercial building. In these embodiments, the mountable lighting system comprising a light or lamp mounted by the mounting bracket assembly 100 can replace expensive and difficult to install flush-mount lighting fixtures.

Figure 6C:
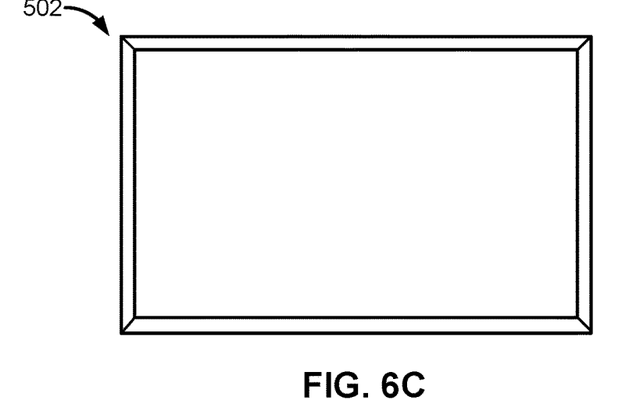
FIG. 6C illustrates yet another embodiment of a mountable object.

FIG. 6C illustrates that the mountable object 502 can be a board or frame that can be mounted to a wall or another mounting surface by the mounting bracket assembly 100. For example, the board can be a whiteboard, blackboard, a dry-erase board, a corkboard, a tack board, a magnetic board, a picture board, or a combination thereof. The frame can be a picture frame, a painting frame, a poster frame, a document frame, or a combination thereof. The board or frame can each have a rear surface comprising a depression or divot defined along the rear surface. The depression or divot can be positioned or defined in proximity to the object mount 104 coupled or affixed to the rear surface of the board or frame (e.g., by screws, clips, or adhesive). In some embodiments, the object mount 104 or features thereof can be incorporated or defined as part of the rear surface of the board or frame.

Figure 6D:
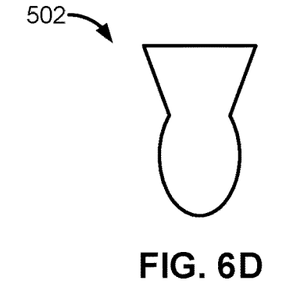
FIG. 6D illustrates a further embodiment of a mountable object.

FIG. 6D illustrates that the mountable object 502 can be a vase or other type of container that can be mounted to a wall or another mounting surface by the mounting bracket assembly 100. For example, the vase can be a plant vase (e.g., a flower vase), a decorative vase, or a combination thereof. The container can be any type of container for storing or housing an object. The vase or container can each have a rear surface comprising a depression or divot defined along the rear surface. The depression or divot can be positioned or defined in proximity to the object mount 104 coupled or affixed to the rear surface of the vase or container (e.g., by screws, clips, or adhesive). In some embodiments, the object mount 104 or features thereof can be incorporated or defined as part of the rear surface of the vase or container.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved. Finally, terms of degree such as "substantially", "about" and "approximately" as used herein mean a reasonable amount of deviation (e.g., a deviation of up to ±0.1%, ±1%, ±5%, or ±10%, as such variations are appropriate) from the specified value such that the end result is not significantly or materially changed.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

We claim:

1. A mounting bracket assembly, comprising:
    a wall mount comprising a curved top, a raised ridge extending from a wall-facing side of the wall mount and a rim segment surrounding the raised ridge, wherein a clearance space is formed in between a wall and the rim segment when the wall mount is mounted to the wall; and
    an object mount configured to be coupled to a surface of a mountable object, wherein the object mount comprises a curved ledge and an inwardly-projecting brim, wherein at least part of the curved ledge accommodates the curved top of the wall mount and the inwardly-projecting brim is positioned within part of the clearance space when the mountable object is mounted to the wall.

2. The mounting bracket assembly of claim 1, wherein the curved ledge is substantially shaped as an arch.

3. The mounting bracket assembly of claim 1, wherein the curved ledge is part of an upside down U-shaped protrusion extending from an object-facing surface of the object mount, and wherein at least part of the upside down U-shaped protrusion is configured to be slid on to the curved top of the wall mount when the wall mount is mounted to the wall in order to mount the mountable object to the wall via the mounting bracket assembly.

4. The mounting bracket assembly of claim 3, wherein the upside down U-shaped protrusion comprises a protrusion front surface, and wherein the protrusion front surface is configured to contact the surface of the mountable object when the object mount is coupled to the mountable object.

5. The mounting bracket assembly of claim 3, wherein the object mount comprises two object mount holes positioned laterally outward of the upside down U-shaped protrusion, and wherein the object mount is coupled to the surface of the mountable object by two screws extending through the two object mount holes.

6. The mounting bracket assembly of claim 1, wherein the wall mount is obround-shaped.

7. The mounting bracket assembly of claim 1, wherein the rim segment is obround-shaped and wherein at least part of the inwardly-projecting brim of the object mount is shaped as an upside down U.

8. The mounting bracket assembly of claim 1, wherein the raised ridge of the wall mount has a ridge height, wherein the rim segment of the wall mount has a rim height, and wherein the ridge height is greater than the rim height.

9. The mounting bracket assembly of claim 8, wherein the curved ledge of the object mount has a ledge height, wherein the ledge height is substantially equal to the rim height of the rim segment.

10. A method of mounting an object to a wall, comprising:
    mounting a wall mount to the wall,
        wherein the wall mount comprises a curved top and a raised ridge extending from a wall-facing side of the wall mount and a rim segment surrounding the raised ridge, wherein a clearance space is formed in between the wall and the rim segment when the wall mount is mounted to the wall; and
    sliding a mountable object comprising an object mount coupled to a surface of the mountable object on to a top of the wall mount to mount the mountable object to the wall,
        wherein the object mount comprises a curved ledge and an inwardly-projecting brim, wherein at least part of the curved ledge rests on the curved top of the wall mount and the inwardly-projecting brim is positioned within part of the clearance space when the mountable object is mounted to the wall.

11. The method of claim 10, wherein the curved ledge is substantially shaped as an arch, wherein the rim segment is obround-shaped, and wherein at least part of the inwardly-projecting brim of the object mount is shaped as an upside down U.

12. The method of claim 10, wherein sliding the mountable object on to the top of the wall mount further comprises sliding at least part of an upside down U-shaped protrusion extending from an object-facing surface of the object mount on to the top of the wall mount.

13. The method of claim 12, further comprising leveling the mountable object by adjusting the mountable object clockwise or counterclockwise when the mountable object is mounted to the wall, wherein the upside down U-shaped protrusion terminates at two protrusion ends, wherein the two protrusion ends flare laterally outward such that a distance separating the two protrusion ends is greater than a ledge width of the curved ledge, and wherein the two protrusion ends are configured to allow a user to level the mountable object.

14. The method of claim 10, wherein the raised ridge of the wall mount has a ridge height, wherein the rim segment of the wall mount has a rim height, and wherein the ridge height is greater than the rim height.

15. The method of claim 10, wherein mounting the wall mount to the wall further comprises screwing one mounting screw into the wall through a singular mounting hole defined in a center of the wall mount, wherein the singular mounting hole is positioned substantially at a midpoint along both a wall mount length and a wall mount width of the wall mount.

16. A mountable lighting system, comprising:
a wall mount comprising a curved top, a raised ridge extending from a wall-facing side of the wall mount and a rim segment surrounding the raised ridge, wherein a clearance space is formed in between a wall and the rim segment when the wall mount is mounted to the wall;
a light comprising a light surface; and
a light mount coupled to or integrated with the light surface, wherein the light mount comprises a curved ledge and an inwardly-projecting brim, wherein at least part of the curved ledge accommodates the curved top of the wall mount and the inwardly-projecting brim is positioned within part of the clearance space when the light is mounted to the wall.

17. The mountable lighting system of claim 16, wherein the light surface comprises a depression or divot defined along the light surface in proximity to the light mount.

18. The mountable lighting system of claim 16, wherein the curved ledge is part of an upside down U-shaped protrusion extending from a light-facing surface of the light mount, and wherein at least part of the upside down U-shaped protrusion is configured to be slid on to the curved top of the wall mount when the wall mount is mounted to the wall in order to mount the light to the wall.

19. The mountable lighting system of claim 16, wherein the curved ledge is substantially shaped as an arch, wherein the rim segment is obround-shaped, and wherein at least part of the inwardly-projecting brim of the light mount is shaped as an upside down U.

20. A mounting bracket assembly, comprising:
a wall mount comprising a raised ridge extending from a wall-facing side of the wall mount and a rim segment surrounding the raised ridge, wherein a clearance space is formed in between a wall and the rim segment when the wall mount is mounted to the wall;
an object mount configured to be coupled to a surface of a mountable object, wherein the object mount comprises a curved ledge and an inwardly-projecting brim, wherein at least part of the curved ledge rests on a top of the wall mount and the inwardly-projecting brim is positioned within part of the clearance space when the mountable object is mounted to the wall; and
wherein the curved ledge is part of an upside down U-shaped protrusion extending from an object-facing surface of the object mount, wherein at least part of the upside down U-shaped protrusion is configured to be slid on to the top of the wall mount when the wall mount is mounted to the wall in order to mount the mountable object to the wall via the mounting bracket assembly, wherein the upside down U-shaped protrusion terminates at two protrusion ends, wherein the two protrusion ends flare laterally outward such that a distance separating the two protrusion ends is greater than a ledge width of the curved ledge, wherein the two protrusion ends are configured to allow a user to level the mountable object when the mountable object is mounted to the wall via the mounting bracket assembly.

* * * * *